US011906145B2

(12) United States Patent
Zhan et al.

(10) Patent No.: US 11,906,145 B2
(45) Date of Patent: Feb. 20, 2024

(54) LAMP CONNECTOR AND TANDEM STRUCTURE OF LIGHT STRIPS

(71) Applicants: SUZHOU OPPLE LIGHTING CO., LTD., Suzhou (CN); OPPLE LIGHTING CO., LTD., Shanghai (CN)

(72) Inventors: Yong Zhan, Suzhou (CN); Xianglan Li, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/081,665

(22) Filed: Dec. 14, 2022

(65) Prior Publication Data

US 2023/0121275 A1 Apr. 20, 2023

Related U.S. Application Data

(63) Continuation of application No. PCT/CN2021/101837, filed on Jun. 23, 2021.

(30) Foreign Application Priority Data

Jun. 29, 2020 (CN) ......................... 202021225158.6

(51) Int. Cl.
*F21V 23/06* (2006.01)
*F21S 4/10* (2016.01)

(52) U.S. Cl.
CPC ................ *F21V 23/06* (2013.01); *F21S 4/10* (2016.01)

(58) Field of Classification Search
CPC .................................. F21V 23/06; F21S 4/10
See application file for complete search history.

(56) References Cited

U.S. PATENT DOCUMENTS 9,033,540 B1 * 5/2015 McCorkle ........... F21V 21/0885 362/396
10,024,526 B1 7/2018 Dankelmann et al.
(Continued)

FOREIGN PATENT DOCUMENTS

CN 106813128 A 6/2017
CN 207021406 U 2/2018
(Continued)

OTHER PUBLICATIONS

International Search Report of PCT Application No. PCT/CN2021/101837 dated Aug. 30, 2021 with English translation, (6p).

*Primary Examiner* — Christopher E Dunay
(74) *Attorney, Agent, or Firm* — Arch & Lake LLP

(57) ABSTRACT

A lamp connector includes an insulating connector body, a first pressing cover, and a second pressing cover. The insulating connector body includes a first electrical connection part, a second electrical connection part, and an electrical connection structure; the first electrical connection part includes a first base, and a first end of the first pressing cover is mounted on the first base through a first rotating shaft structure, a second end of the first pressing cover is fixed to the first base through a first fixing structure. The second electrical connection part includes a second base, and a third end of the second pressing cover is mounted on the second base through a second rotating shaft structure, a fourth end of the second pressing cover is fixed to the second base through a second fixing structure.

15 Claims, 8 Drawing Sheets

(56) References Cited

U.S. PATENT DOCUMENTS

| | | | | |
|---|---|---|---|---|
| 10,591,114 | B1 * | 3/2020 | Lassen | F21V 15/013 |
| 2015/0241035 | A1 * | 8/2015 | Dankelmann | F21V 21/005<br>439/725 |
| 2017/0370567 | A1 * | 12/2017 | Zheng | F21V 23/06 |
| 2018/0299082 | A1 * | 10/2018 | Li | F21V 15/01 |
| 2020/0403360 | A1 * | 12/2020 | Shao | H01R 31/06 |
| 2022/0205600 | A1 * | 6/2022 | Cai | F21V 21/005 |
| 2022/0268431 | A1 * | 8/2022 | Brandstätter | H01R 13/582 |
| 2022/0373169 | A1 * | 11/2022 | Wang | F21S 8/031 |

FOREIGN PATENT DOCUMENTS

| | | | |
|---|---|---|---|
| CN | 107975697 | A | 5/2018 |
| CN | 207298836 | U | 5/2018 |
| CN | 207394754 | U | 5/2018 |
| CN | 207407299 | U | 5/2018 |
| CN | 207648744 | U | 7/2018 |
| CN | 209399170 | U | 9/2019 |
| CN | 210462581 | U | 5/2020 |
| CN | 212056838 | U | 12/2020 |

* cited by examiner

LAMP CONNECTOR AND TANDEM STRUCTURE OF LIGHT STRIPS

CROSS-REFERENCE TO RELATED APPLICATIONS

The present application is a continuation of PCT patent application No. PCT/CN2021/101837 filed on Jun. 23, 2021 which claims priority to the Chinese Patent Application No. 202021225158.6, filed on Jun. 29, 2020 with the title of the utility model "LAMP CONNECTOR AND TANDEM STRUCTURE OF LIGHT STRIPS", the entire disclosures of which are incorporated herein by reference for all purposes.

TECHNICAL FIELD

The present application relates to the technical field of lighting equipment, and in particular, to a lamp connector and a tandem structure of light strips.

BACKGROUND

With the rapid development of the lighting industry and the improvement of people's living standards, people's requirements for lighting equipment are getting higher and higher, and the demand for lighting equipment is becoming more and more diverse. LED flexible light strips are widely used in building installations and landscape decoration due to their special luminous effects.

During the use of the LED flexible light strip, the LED light strip needs to connect with other electrical device (e.g., a power cable, an adjacent LED flexible light strip, etc.) through a connector. At present, the LED flexible light strip is usually provided with a connecting rubber sleeve at connector position, and the connecting rubber sleeve is directly sleeved with a soft rubber tube of the LED flexible light strip. During the use process, the connecting rubber sleeve and the soft rubber tube are easy to loosen and disengage, resulting in incomplete contact and loosening of the connector position, which is easy to cause arcing and sparking, and there is a greater safety hazard.

Accordingly, it is desirable to provide a connector that overcomes or at least alleviates the above-mentioned deficiencies of the prior art.

SUMMARY

The present application discloses a lamp connector to solve the problem that the lamp is prone to loosening and disengaging at the connector position.

In order to solve the above-mentioned problem, the present application adopts the following technical solutions:

A lamp connector, comprising: an insulating connector body, a first pressing cover, and a second pressing cover; the insulating connector body comprises a first electrical connection part and a second electrical connection part, and an electrical connection structure is provided between the first electrical connection part and the second electrical connection part. The first electrical connection part comprises a first base, and a first end of the first pressing cover is mounted on the first base through a first rotating shaft structure, the first pressing cover is rotated to switch between an open position and a closed position; in a case where the first pressing cover is in the closed position, a second end of the first pressing cover is fixed to the first base through a first fixing structure, the first base and the first pressing cover enclose a first electrical connection cavity, and a first insertion opening connecting the first electrical connection cavity and an external space is between the first base and the first pressing cover. The second electrical connection part comprises a second base, and a third end of the second pressing cover is mounted on the second base through a second rotating shaft structure, so that the second pressing cover is rotated to switch between an open position and a closed position; in a case where the second pressing cover is in the closed position, a fourth end of the second pressing cover is fixed to the second base through a second fixing structure, the second base and the second pressing cover enclose a second electrical connection cavity, and a second insertion opening connecting the second electrical connection cavity and the external space is between the second base and the second pressing cover.

A tandem structure of light strips, comprising: a first light strip, a second light strip, and the above-mentioned lamp connector; a first light strip electrical connection terminal of the first light strip is inserted into the first electrical connection cavity, a second light strip electrical connection terminal of the second light strip is inserted into the second electrical connection cavity, the first light strip electrical connection terminal and the second light strip electrical connection terminal are electrically connected through the electrical connection structure, wherein the first pressing cover cooperates with the first base to clamp the first light strip, the second pressing cover cooperates with the second base to clamp the second light strip.

A tandem structure of light strips, comprising: a first light strip, a second light strip, and the above mentioned lamp; a first light strip electrical connection terminal of the first light strip is inserted into the first electrical connection cavity, a second light strip electrical connection terminal of the second light strip is inserted into the second electrical connection cavity, the first light strip electrical connection terminal and the second light strip electrical connection terminal are electrically connected through the electrical connection structure, wherein the first pressing cover cooperates with the first base to clamp the first light strip, the second pressing cover cooperates with the second base to clamp the second light strip; wherein the first light strip comprises a first soft rubber sleeve, the first light strip electrical connection terminal is arranged in the first soft rubber sleeve, the first electrical connection terminal is inserted into the first soft rubber sleeve, and the first light strip electrical connection terminal and the first electrical connection terminal at least partially overlap with each other in a pressing direction of the first pressing cover, wherein the second light strip comprises a second soft rubber sleeve, the second light strip electrical connection terminal is arranged in the second soft rubber sleeve, the second electrical connection terminal is inserted into the second soft rubber sleeve, and the second light strip electrical connection terminal and the second electrical connection terminal at least partially overlap with each other in a pressing direction of the second pressing cover.

BRIEF DESCRIPTION OF THE DRAWINGS

The drawings described here are used to provide further understanding of the present application and constitute a part of the present application. The examples and their descriptions are used to explain the present application and do not constitute an improper limitation of the present application. In the drawings.

DETAILED DESCRIPTION

Description of Reference Numerals

Figure 1:
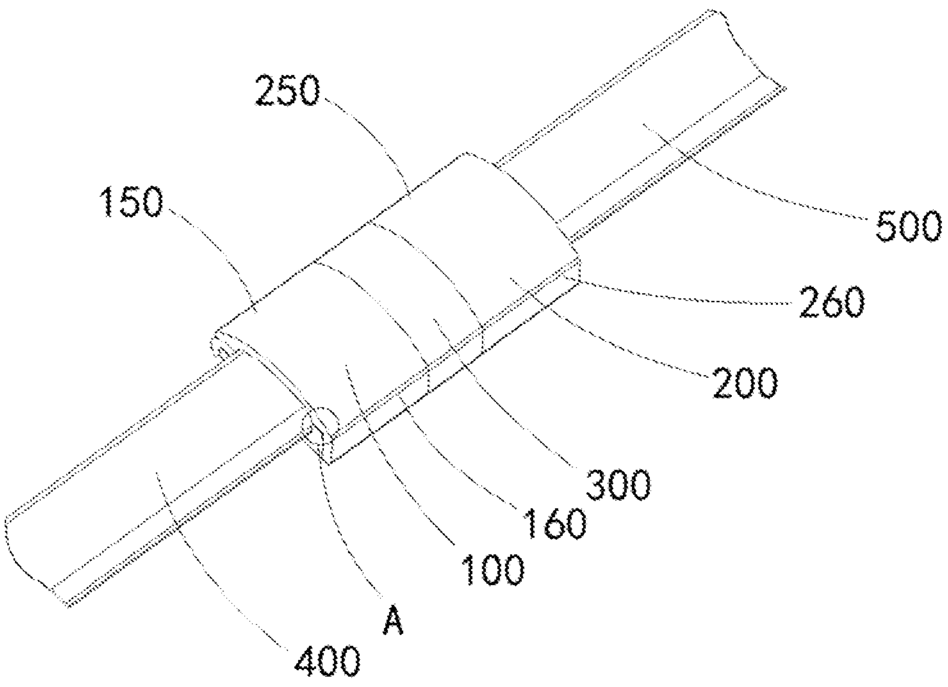
FIG. 1 is a schematic diagram of a tandem structure of light strips disclosed in an example of the present application, wherein a first pressing cover and a second pressing cover are in a closed position.

100—first pressing cover, 110—first clamping boss, 120—first pressing cover cavity, 130—first pressing cover end face, 140—first clamping protrusion, 150—first end, 160—second end, 200—second pressing cover, 210—second clamping boss, 220—second pressing cover cavity, 230—second pressing cover end face, 240—second clamping protrusion, 250—third end, 260—fourth end, 300—insulating connector body, 310—first base, 311—first clamping rib, 312—first clamping groove, 313—first base cavity, 314—first base end face, 315—first prying gap, 320—second base, 321—second clamping rib, 322—second clamping groove, 323—second base cavity, 324—second base end face, 325—second prying gap, 330—insulating structure body, 331—first insertion piece, 332—second insertion piece, 333—first gap, 334—second gap, 335—third gap, 336—fourth gap, 340—conductive core, 341—first electrical connection terminal, 342—second electrical connection terminal, 343—additional electrical connection terminal, 344—flexible wire, 350—additional base, 360—rotating connection part, 361—first rotating shaft sleeve, 362—second rotating shaft sleeve, 363—rotating shaft, 370—first electrical connection cavity, 371—first insertion opening, 380—second electrical connection cavity, 381—second insertion opening, 400—first light strip, 410—first soft rubber sleeve, 420—first light strip electrical connection terminal, 500—second light strip, 510—second soft rubber sleeve, 520—second light strip electrical connection terminal, 600—first rotating shaft structure, 610—first shaft sleeve, 611—first shaft installation opening, 612—first shaft anti-disengagement boss, 620—first shaft, 700—second rotating shaft structure, 710—second shaft sleeve, 711—second shaft installation opening, 712—second shaft anti-disengagement boss, 720—second shaft, 800—additional pressing cover, 900—first avoidance gap.

In order to make the objects, technical solutions and advantages of the present application clearer, the technical solution of the present application will be clearly and completely described below in combination with specific examples of the present application and the corresponding drawings. Obviously, the described examples are only a part of examples of the present application, rather than all examples of the present application. Based on examples of the present application, all other examples obtained by those of ordinary skill in the art without creative work will fall within the protection scope of the present application.

The technical solutions disclosed in examples of the present application will be described in detail below with reference to the drawings.

The example of the present application discloses a lamp connector, referring to FIGS. 1 to 4, the lamp connector includes an insulating connector body 300, a first pressing cover 100, and a second pressing cover 200, the insulating connector body 300 includes a first electrical connection part and a second electrical connection part, and an electrical connection structure is provided between the first electrical connection part and the second electrical connection part. The above-mentioned lamp connector can fix an electrical connection terminal of a first electrical element (for example, a wire, a light strip, etc.) to the first electrical connection part, and fix an electrical connection terminal of a second electrical element to the second electrical connection part, and the two electrical connection terminals are electrically connected by the electrical connection structure. The materials of the insulating connector body 300, the first pressing cover 100 and the second pressing cover 200 may be appropriately selected according to actual needs. For example, the insulating connector body 300, the first pressing cover 100 and the second pressing cover 200 are made of transparent ABS plastic (A terpolymer of three monomers, i.e. acrylonitrile (A), butadiene (B), and styrene (S)).

The first electrical connection part includes a first base 310, a first end 150 of the first pressing cover 100 is mounted on the first base 310 through a first rotating shaft structure 600, and the first pressing cover 100 is rotated to switch between an open position and a closed position. The first rotating shaft structure 600 makes the rotational connection position between the first pressing cover 100 and the first base 310 stable and reliable, which improves the stability and reliability of the connector position of the lamp, and makes the turning of the first pressing cover 100 smooth and the operation convenient, which improves the wiring efficiency of the lamp. In a case where the first pressing cover 100 is in the closed position, a second end 160 of the first pressing cover 100 can be fixed to the first base 310 through a first fixing structure, the first base 310 and the first pressing cover 100 enclose a first electrical connection cavity 370, the first electrical connection cavity 370 is used for the electrical connection terminal of the first electrical element to be inserted, and a first insertion opening 371 connecting the first electrical connection cavity 370 and an external space is formed between the first base 310 and the first pressing cover 100.

The second electrical connection part includes a second base 320, and a third end 250 of the second pressing cover 200 is mounted on the second base 320 through a second rotating shaft structure 700, so that the second pressing cover 200 is rotated to switch between an open position and a closed position. The second rotating shaft structure 700 makes the rotational connection position between the second pressing cover 200 and the second base 320 stable and reliable, which improves the stability and reliability of the connector position of the lamp, and makes the turning of the second pressing cover 200 smooth and the operation convenient, which improves the wiring efficiency of the lamp. In a case where the second pressing cover 200 is in the closed position, a fourth end 260 of the second pressing cover 200 can be fixed to the second base 320 through a second fixing structure, the second base 320 and the second pressing cover 200 enclose a second electrical connection cavity 380, and a second insertion opening 381 connecting the second electrical connection cavity 380 and the external space is formed between the second base 320 and the second pressing cover 200.

In the lamp connector disclosed in the example of the present application, the electrical connection terminal of the first electrical element is inserted into the first electrical connection cavity 370 through the first insertion opening 371, and the electrical connection terminal is fixed in the first electrical connection cavity 370 through the first pressing cover 100. The electrical connection terminal of the second electrical element is inserted into the second electrical connection cavity 380 through the second insertion opening 381, and the electrical connection terminal is fixed in the second electrical connection cavity 380 through the second pressing cover 200. The two electrical connection terminals are electrically connected through the electrical connection structure, the connector between the two electrical elements is stable and reliable, and the connection is convenient.

The specific structures of the first rotating shaft structure 600 and the second rotating shaft structure 700 may be appropriately selected according to actual needs. For example, the first pressing cover 100 and the first base 310 are respectively provided with a first shaft sleeve and a second shaft sleeve, the first pressing cover 100 and the first base 310 are connected by a shaft passing through the first shaft sleeve and the second shaft sleeve. Optionally, referring to FIGS. 4 to 8, the first rotating shaft structure 600 includes a first shaft sleeve 610 and a first shaft 620, the first shaft 620 is fixed to the first end 150 of the first pressing cover 100, the first shaft sleeve 610 is fixed to the first base 310, the first shaft sleeve 610 is sleeved on the outside of the first shaft 620. The second rotating shaft structure 700 includes a second shaft sleeve 710 and a second shaft 720, the second shaft 720 is fixed to the third end 250 of the second pressing cover 200, the second shaft sleeve 710 is fixed to the second base 320, the second shaft sleeve 710 is sleeved on the outside of the second shaft 720. The first rotating shaft structure 600 and the second rotating shaft structure 700 have simple structures, which can improve the assembly efficiency of the lamp connector.

Further, the first shaft sleeve 610 is provided with a first shaft installation opening 611, in the case where the first pressing cover 100 is in the closed position, the first shaft installation opening 611 faces a direction away from the first pressing cover 100. The first rotating shaft structure 600 can be assembled by pressing the first shaft 620 into the first shaft sleeve 610 through the first shaft installation opening 611. The second shaft sleeve 710 is provided with a second shaft installation opening 711, in the case where the second pressing cover 200 is in the closed position, the second shaft installation opening 711 faces a direction away from the second pressing cover 200. The second rotating shaft structure 700 can be assembled by pressing the second shaft 720 into the second shaft sleeve 710 through the second shaft installation opening 711. The assembly of the first rotating shaft structure 600 and the second rotating shaft structure 700 is simple and quick, and the first shaft installation opening 611 and the second shaft installation opening 711 are on the side away from the first pressing cover 100 and the second pressing cover 200 respectively, so as to prevent the first shaft 620 and the second shaft 720 from disengaging with the respective shaft sleeves.

Figure 6:
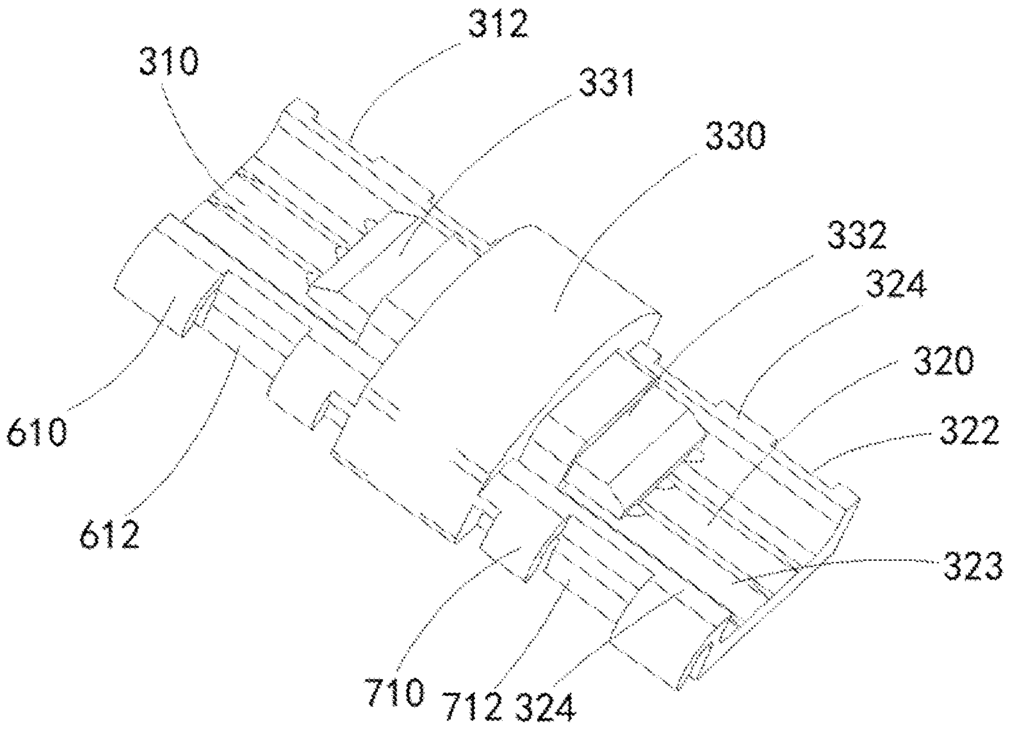
FIG. 6 is a schematic diagram of the lamp connector shown in FIG. 4 after removing the first pressing cover and the second pressing cover.

Referring to FIG. 6, a first shaft anti-disengagement boss 612 is provided at the first shaft installation opening 611, the first shaft anti-disengagement boss 612 protrudes toward the inside of the first shaft sleeve 610, to improve the stability and reliability of the first shaft 620. A second shaft anti-disengagement boss 712 is provided at the second shaft installation opening 711, the second shaft anti-disengagement boss 712 protrudes toward an inside of the second shaft sleeve 710, to improve the stability and reliability of the second shaft 720.

Figure 4:
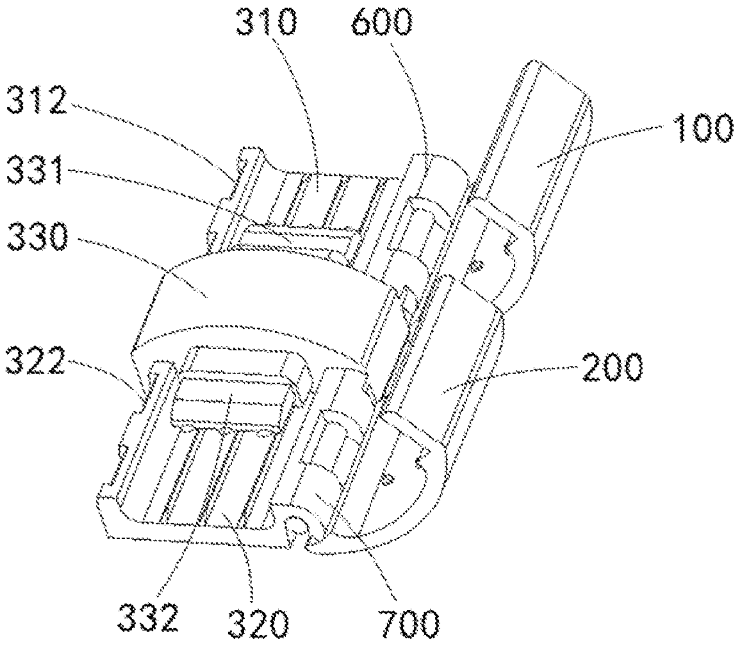
FIG. 4 is a schematic diagram of a lamp connector disclosed in a first example of the present application, wherein the first pressing cover and the second pressing cover are in the open position.
Figure 5:
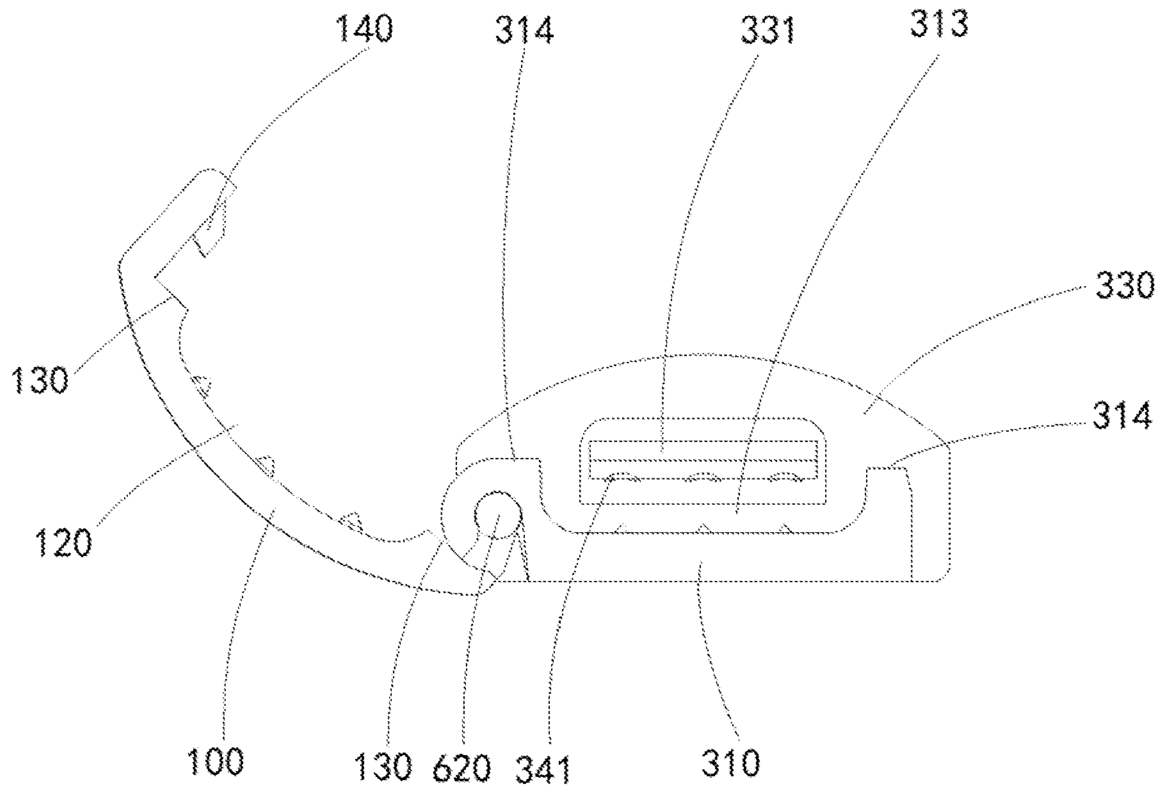
FIG. 5 is a schematic diagram of the lamp connector shown in FIG. 4 from another perspective view.

The specific structures of the first fixing structure and the second fixing structure may be appropriately selected according to actual needs, for example, a screw connection structure, a pin connection structure, or bonding may be selected. Optionally, referring to FIGS. 4 to 8, the first fixing structure includes a first clamping protrusion 140 and a first clamping groove 312, the first clamping protrusion 140 is arranged on one of the first pressing cover 100 and the first base 310, and the first clamping groove 312 is arranged on the other of the first pressing cover 100 and the first base 310. The first pressing cover 100 can be fixed to the first base 310 by the first clamping protrusion 140 being clamped to the first clamping groove 312, no additional fixing member is required, the structure is simple, and the connection is reliable. The second fixing structure includes a second clamping protrusion 240 and a second clamping groove 322, the second clamping protrusion 240 is arranged on one of the second pressing cover 200 and the second base 320, and the second clamping groove 322 is arranged on the other of the second pressing cover 200 and the second base 320. The second pressing cover 200 can be fixed to the second base 320 by the second clamping protrusion 240 being clamped to the second clamping groove 322, no additional fixing member is required, the structure is simple, and the connection is reliable. Referring to FIG. 4, FIG. 5 and FIG. 8, in the illustrated example, the first clamping protrusion 140 is provided on the first pressing cover 100, the first clamping groove 312 is provided on the first base 310; and the second clamping protrusion 240 is provided on the second pressing cover 200, the second clamping groove 322 is provided on the second base 320.

Figure 7:
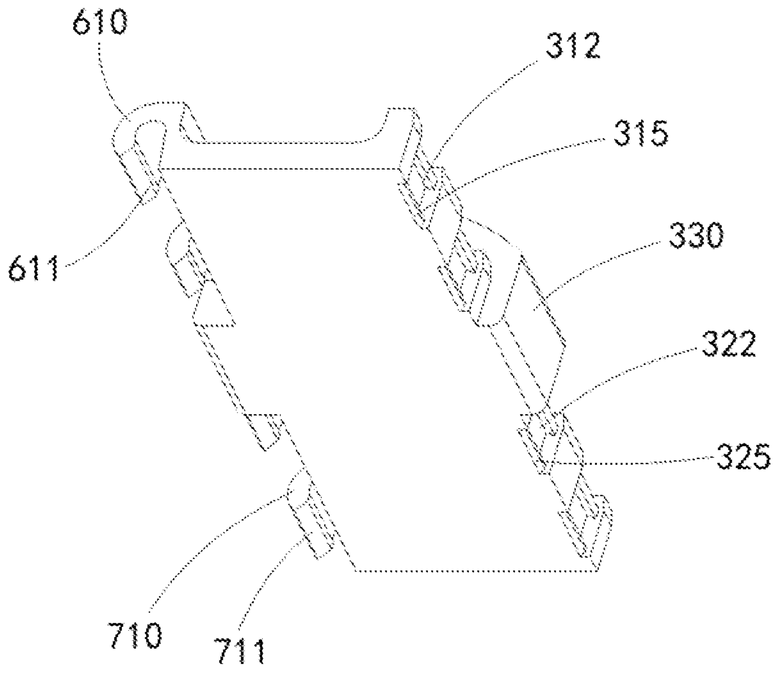
FIG. 7 is a schematic diagram of the lamp connector shown in FIG. 6 from another perspective view after removing the first pressing cover and the second pressing cover.
Figure 8:
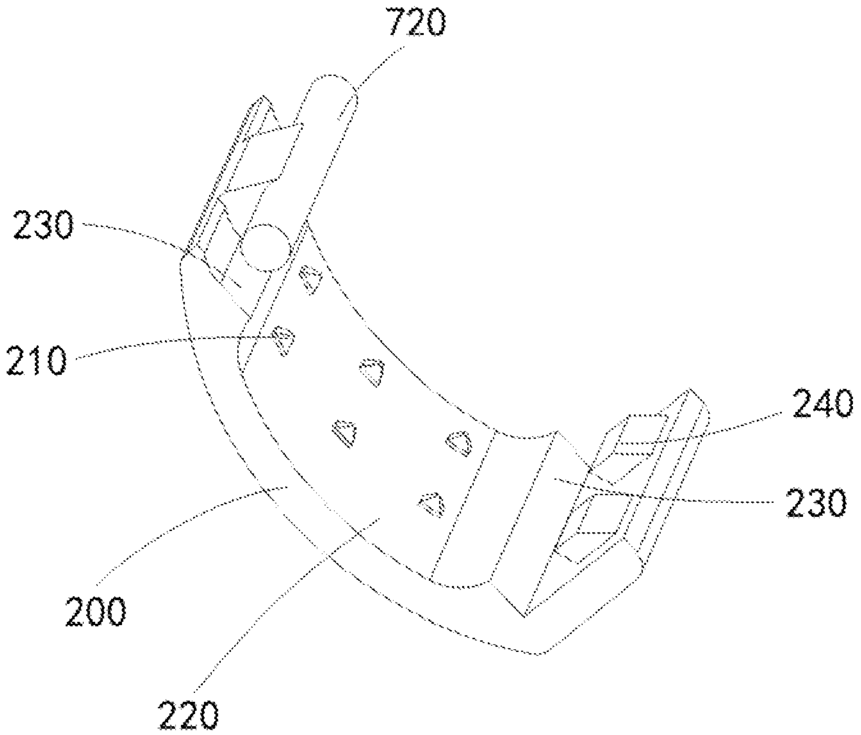
FIG. 8 is a schematic diagram of the first pressing cover of the lamp connector shown in FIG. 1.
Figure 9:
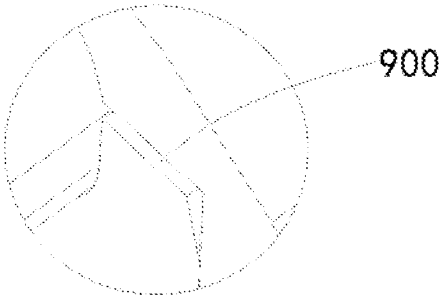
FIG. 9 is a partial enlarged schematic diagram of a part A of the tandem structure of the light strips shown in FIG. 1.

Referring to FIG. 5, FIG. 7 and FIG. 8, the clamping position of the first clamping protrusion 140 and the first clamping groove 312 is provided with an acute-angle hooking structure, so as to avoid accidental disengagement of the first clamping protrusion 140 with the first clamping groove 312. Similarly, the clamping position of the second clamping protrusion 240 and the second clamping groove 322 is also provided with an acute-angle hooking structure, so as to avoid accidental disengagement of the second clamping protrusion 240 with the second clamping groove 322.

Further, the first fixing structure includes a first prying gap 315 provided between the first base 310 and the first pressing cover 100, the first prying gap 315 is on a side of the first base 310 away from the first electrical connection cavity 370. The second fixing structure includes a second prying gap 325 provided between the second base 320 and the second pressing cover 200, the second prying gap 325 is on a side of the second base 320 away from the second electrical connection cavity 380. When the first pressing cover 100 or the second pressing cover 200 needs to be switched from the closed position to the open position, a prying tool is used to insert into the first prying gap 315 or the second prying gap 325 and pry up the first pressing cover 100 or the second pressing cover 200, the clamping protrusion is released from the clamping groove, so as to open the corresponding first pressing cover 100 or the second pressing cover 200.

Referring to FIG. 5, FIG. 6 and FIG. 8, in the example of the present application, the first base 310 is provided with a first base end face 314 and a first base cavity 313, the first pressing cover 100 is provided with a first pressing cover end face 130 and a first pressing cover cavity 120; the first base cavity 313 and the first pressing cover cavity 120 constitute the first electrical connection cavity 370, a first avoidance gap 900 is formed between the first base end face 314 and the first pressing cover end face 130. The shape and size of the first avoidance gap 900 may be appropriately designed according to actual needs, the first avoidance gap 900 may accommodate a deformed part of a soft rubber sleeve of the first electrical element inserted in the first electrical connection cavity 370, so as to provide space for the rebound of the soft rubber sleeve, thereby enabling the connection of the first fixing structure smoother.

Similarly, the second base 320 is provided with a second base end face 324 and a second base cavity 323, the second pressing cover 200 is provided with a second pressing cover end face 230 and a second pressing cover cavity 220; the second base cavity 323 and the second pressing cover cavity 220 constitute the second electrical connection cavity 380, a second avoidance gap (which is not shown in the figure, in the illustrated example, the first avoidance gap 900 and the second avoidance gap have the same structure) is between the second base end face 324 and the second pressing cover end face 230. The shape and size of the second avoidance gap may be appropriately designed according to actual needs, the second avoidance gap may accommodate a deformed part of a soft rubber sleeve of the second electrical element inserted in the second electrical connection cavity 380, so as to provide space for the rebound of the soft rubber sleeve, thereby enabling the connection of the second fixing structure smoother.

Further, the first avoidance gap 900 is located at the second end 160 of the first pressing cover 100, so as to prevent the first rotating shaft structure 600 from loosening in the case where the gap is located at the first end 150 and to avoid affecting the normal rotation of the first rotating shaft structure 600 due to the soft rubber sleeve entering the first rotating shaft structure 600. Similarly, the second avoidance gap is located at the fourth end 260 of the second pressing cover 200, so as to prevent the second rotating shaft structure 700 from loosening in the case where the gap is located at the third end 250 and to avoid affecting the normal rotation of the second rotating shaft structure 700 due to the soft rubber sleeve entering the second rotating shaft structure 700.

Figure 3:
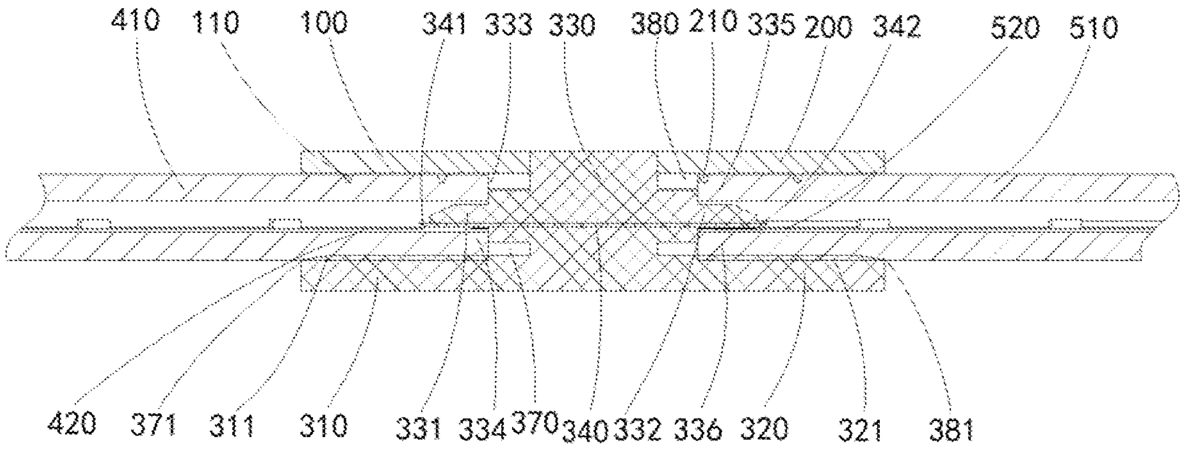
FIG. 3 is a cross-sectional view of the tandem structure of the light strips shown in FIG. 1.

Referring to FIG. 3, FIG. 5 and FIG. 8, the first pressing cover 100 includes a first clamping boss 110, the first clamping boss 110 protrudes toward the first electrical connection cavity 370; the second pressing cover 200 includes a second clamping boss 210, the second clamping boss 210 protrudes toward the second electrical connection cavity 380. The first clamping boss 110 may be pressed into the soft rubber sleeve of the first electrical element in the case where the first pressing cover 100 is in the closed position, so that the electrical connection terminal of the first electrical element is more stably and reliably clamped between the first pressing cover 100 and the first base 310. The second clamping boss 210 may be pressed into the soft rubber sleeve of the second electrical element in the case where the second pressing cover 200 is in the closed position, so that the electrical connection terminal of the second electrical element is more stably and reliably clamped between the second pressing cover 200 and the second base 320.

Referring to FIG. 3, FIG. 5 and FIG. 6, the first base 310 includes a first clamping rib 311, and the first clamping rib 311 protrudes toward the first electrical connection cavity 370; the second base 320 includes a second clamping rib 321, and the second clamping rib 321 protrudes toward the second electrical connection cavity 380. The first clamping rib 311 may be pressed into the soft rubber sleeve of the first electrical element in the case where the first pressing cover 100 is in the closed position, so that the electrical connection terminal of the first electrical element is more stably and reliably clamped between the first pressing cover 100 and the first base 310. The second clamping rib 321 may be pressed into the soft rubber sleeve of the second electrical element in the case where the second pressing cover 200 is in the closed position, so that the electrical connection terminal of the second electrical element is more stably and reliably clamped between the second pressing cover 200 and the second base 320. The shape, number and distribution of the clamping bosses and the clamping ribs may be appropriately selected according to actual needs on the basis that the clamping bosses and the clamping ribs can clamp the electrical connection terminals of the electrical elements tightly.

Figure 10:
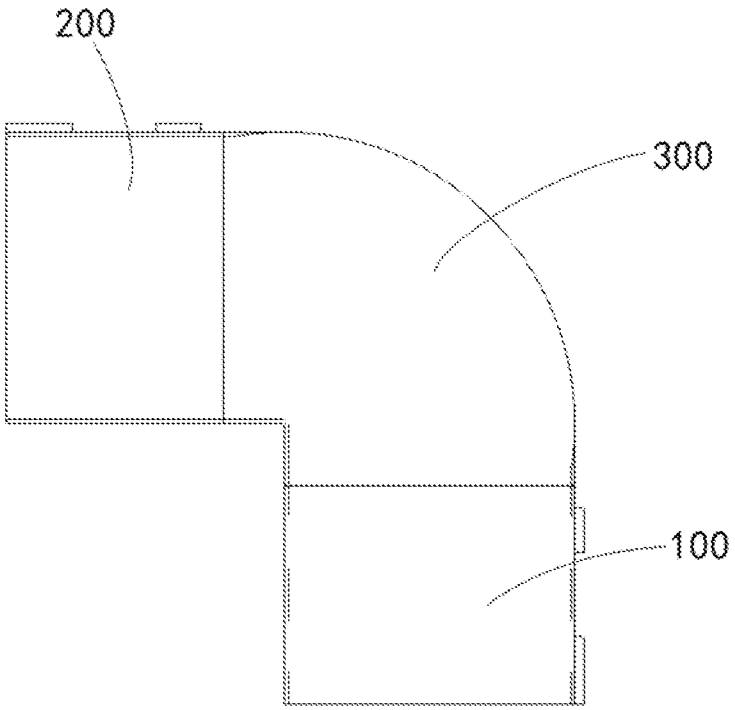
FIG. 10 is a schematic diagram of the lamp connector according to a second example of the present application.
Figure 11:
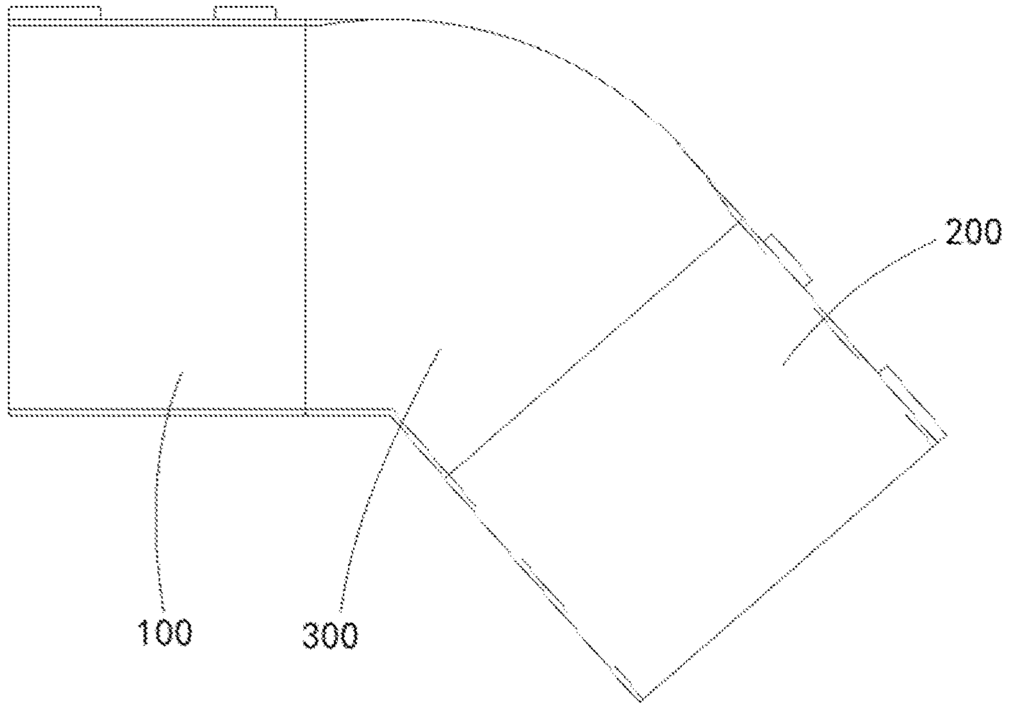
FIG. 11 is a schematic diagram of the lamp connector according to a third example of the present application.

The shape, size and structure of the insulating connector body 300 may be appropriately selected according to actual needs. Referring to the lamp connector disclosed in the first example of the present application shown in FIGS. 4 to 9, the insulating connector body 300 extends along a straight line, and the first base 310 and the second base 320 are located at both ends of the insulating connector body 300. Referring to the lamp connectors disclosed in the second example and the third example of the present application shown in FIG. 10 and FIG. 11, the insulating connector body 300 extends along an arc, the first base 310 and the second base 320 are located at both ends of the insulating connector body 300. The radian and length of the above-mentioned arc may be appropriately selected according to actual needs, for example, 90 degrees, 45 degrees and so on.

The first electrical element disposed in the first electrical connection part and the second electrical element disposed in the second electrical connection part may be electrically connected in any appropriate manner, and the specific structure of the electrical connection structure may be appropriately selected according to actual needs; the lamp connector disclosed in the example of the present application can fix the electrical connection terminals of the two electrical elements, thereby improving the reliability of the connector.

Optionally, referring to FIG. 3, the electrical connection structure includes an insulating structure body 330 and a conductive core 340, the insulating structure body 330 wraps on the outside of the conductive core 340; the conductive core 340 includes a first electrical connection terminal 341, a second electrical connection terminal 342, the first electrical connection terminal 341 is exposed in the first electrical connection cavity 370, the second electrical connection terminal 342 is exposed in the second electrical connection cavity 380. The electrical connection terminal of the first electrical element inserted into the first electrical connection cavity 370 is electrically connected to the first electrical connection terminal 341, the electrical connection terminal of the second electrical element inserted into the second electrical connection cavity 380 is electrically connected to the second electrical connection terminal 342, so that the electrical connection terminal of the first electrical element only needs to be electrically connected to the second electrical connection terminal 342 to realize the electrical connection between the first electrical element and the second electrical element, the electrical connection between the two electrical elements is simpler and faster. The first electrical connection terminal 341 of the conductive core 340 and the second electrical connection terminal 342 of the conductive core 340 may be electrically connected by any suitable conductive element. For example, the conductive core 340 is integrally formed as a conductive copper sheet, an end of the conductive copper sheet extends into the first electrical connection cavity 370 and serves as the first electrical connection terminal 341, and the other end of the conductive copper sheet extends into the second electrical connection cavity 380 and serves as the second electrical connection terminal 342.

Optionally, the insulating structure body 330 includes a first insertion piece 331 extending into the first electrical connection cavity 370 and a second insertion piece 332 extending into the second electrical connection cavity 380; the first electrical connection terminal 341 is on a side of the first insertion piece 331 facing towards the first base 310, the second electrical connection terminal 342 is on a side of the second insertion piece 332 facing towards the second base 320. The first insertion piece 331 can support the first electrical connection terminal 341 to avoid affecting the electrical connection effect due to the deformation of the first electrical connection terminal 341 during the insertion process. The second insertion piece 332 can support the second electrical connection terminal 342 to avoid affecting the electrical connection effect due to the deformation of the second electrical connection terminal 342 during the insertion process. Referring to FIG. 3, the first insertion piece 331 and the first electrical connection terminal 341 are pressed into the soft rubber sleeve of the first electrical element (i.e., the first soft rubber sleeve 410 of the first light strip 400 in FIG. 3). The second insertion piece 332 and the second electrical connection terminal 342 are pressed into the soft rubber sleeve of the second electrical element (i.e., the second soft rubber sleeve 510 of the second light strip 500 in FIG. 3).

Referring to FIG. 3, in the example of the present application, a first gap 333 is between the first insertion piece 331 and the first pressing cover 100, a second gap 334 is between the first insertion piece 331 and the first base 310, a third gap 335 is between the second insertion piece 332 and the second pressing cover 200, and a fourth gap 336 is between the second insertion piece 332 and the second base 320. The soft rubber sleeve of the first electrical element is in the first gap 333 and the second gap 334, so that the soft rubber sleeve, the electrical connection terminal of the first electrical element and the first electrical connection terminal 341 can be pressed together tightly by the first pressing cover 100 and the first base 310. The soft rubber sleeve of the second electrical element is in the third gap 335 and the fourth gap 336, so that the soft rubber sleeve, the electrical connection terminal of the second electrical element and the second electrical connection terminal 342 can be pressed together tightly by the second pressing cover 200 and the second base 320.

Figure 15:
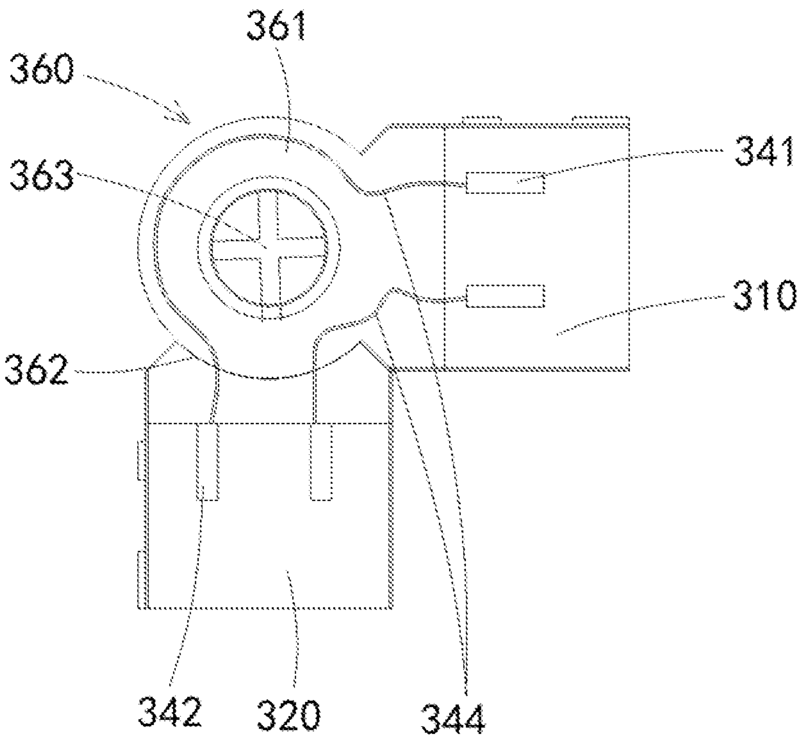
FIG. 15 is a schematic diagram of the lamp connector according to a seventh example of the present application.

Referring to FIG. 15, in the lamp connector disclosed in the seventh example of the present application, the insulating connector body 300 includes a rotating connection part 360, the first electrical connection part and the second electrical connection part are connected through the rotating connection part 360. The first electrical connection part and the second electrical connection part can rotate relative to each other around a central axis of the rotating connection part 360. The angle between the first electrical connection part and the second electrical connection part may be flexibly adjusted according to actual needs during use. The structure of the rotating connection part 360 may be appropriately selected according to actual needs. The rotating connection part 360 includes a first rotating shaft sleeve 361, a second rotating shaft sleeve 362 and a rotating shaft 363, the first rotating shaft sleeve 361 and the second rotating shaft sleeve 362 are sleeved on the outside of the rotating shaft 363, the first rotating shaft sleeve 361 is fixed on the first electrical connection part, the second rotating shaft sleeve 362 is fixed on the second electrical connection part. The rotating shaft structure is simple in structure and flexible in rotation.

In the case where the insulating connector body 300 includes the rotating connection part 360, the distance between the first electrical connection cavity 370 and the second electrical connection cavity 380 and the included angle between the first electrical connection cavity 370 and the second electrical connection cavity 380 is changed with the rotation of the rotating connection part. In order to ensure that the conductive core 340 can adapt to the distance change and angle change during the rotation of the rotating connection part 360, the conductive core 340 includes a flexible wire 344 connecting the first electrical connection terminal 341 and the second electrical connection terminal 342, and a wire channel is provided in the first rotating shaft sleeve 361 and the second rotating shaft sleeve 362, the flexible wire 344 extends through the wire channel. The flexible wire 344 can adapt to the angle change during the rotation of the rotating connection part 360, and in addition, the flexible wire 344 preferably preset a certain margin to adapt to the length change during the rotating process of the rotating connection part 360.

Figure 12:
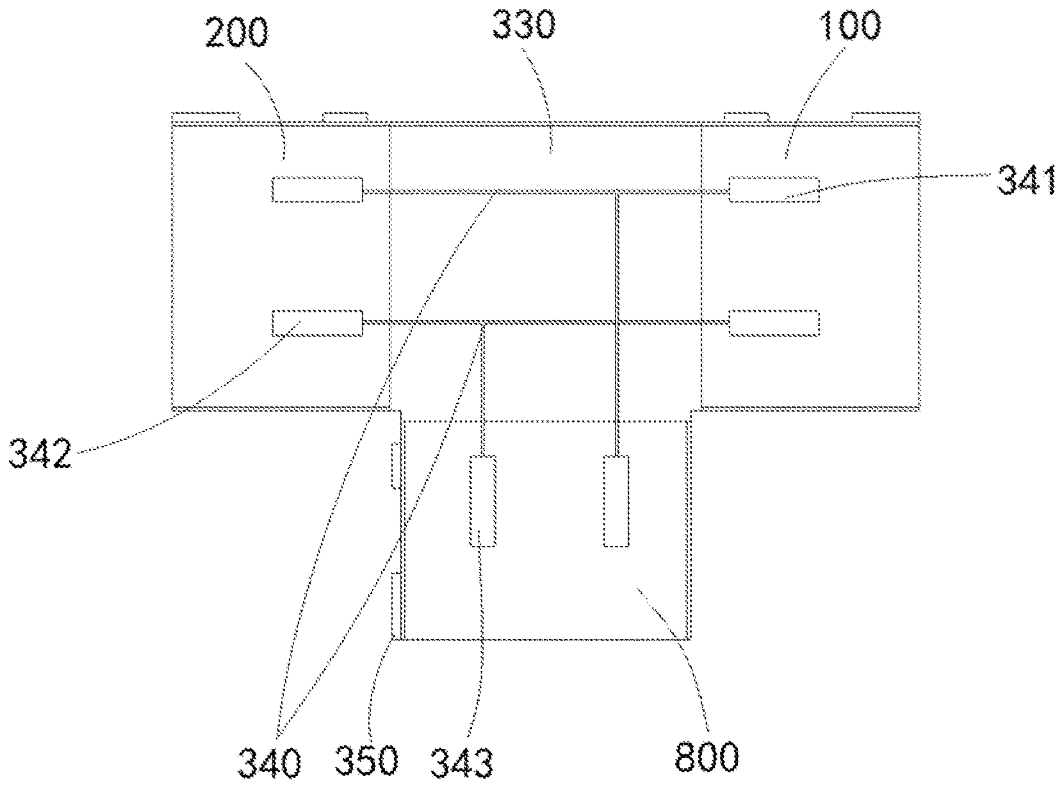
FIG. 12 is a schematic diagram of the lamp connector according to a fourth example of the present application.
Figure 13:
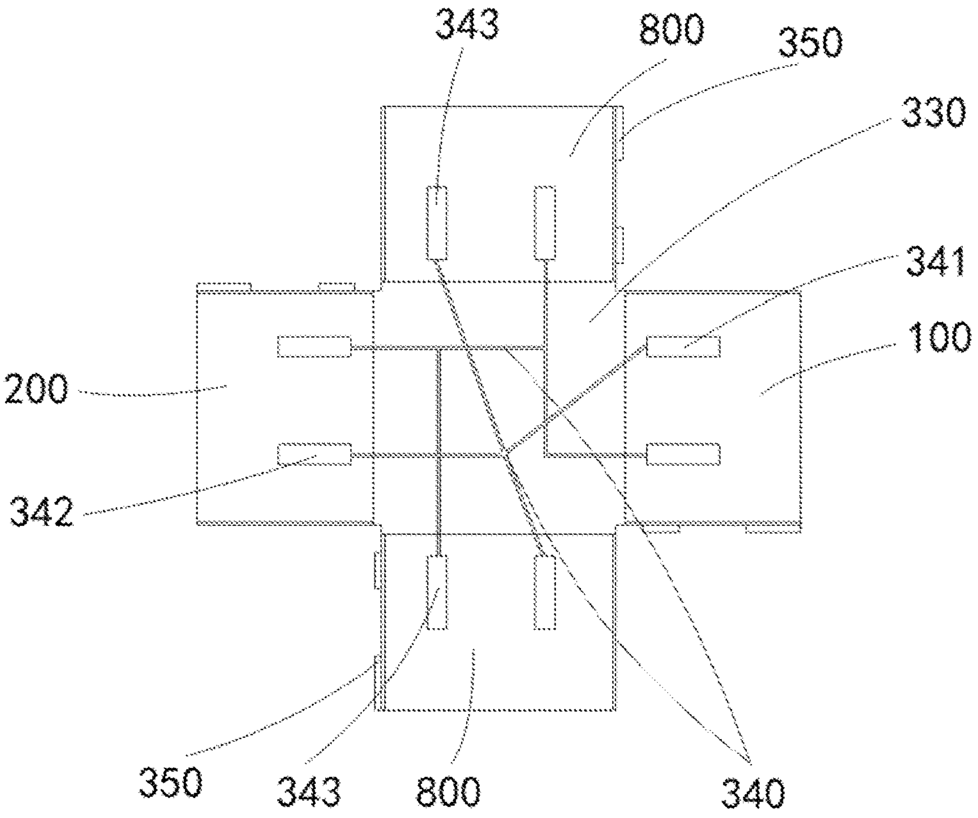
FIG. 13 is a schematic diagram of the lamp connector according to a fifth example of the present application.
Figure 14:
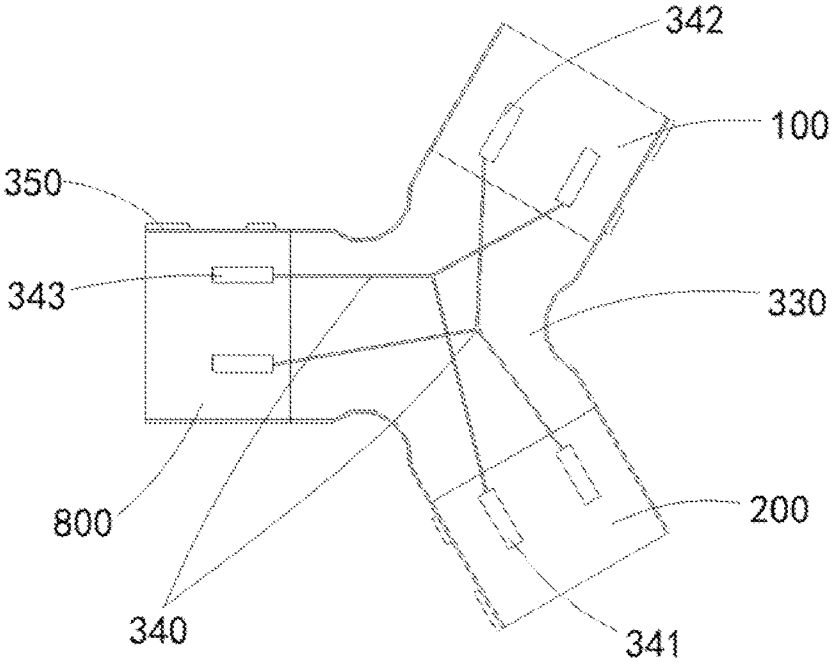
FIG. 14 is a schematic diagram of the lamp connector according to a sixth example of the present application.

Referring to the lamp connectors in the fourth, fifth and sixth examples of the present application shown in FIGS. 12 to 14, the lamp connector further includes one or more additional pressing covers 800, the insulating connector body 300 include one or more additional electrical connection parts. The additional electrical connection part includes an additional base 350, the additional base 350 and the additional pressing cover 800 enclose an additional electrical connection cavity; and an additional insertion opening connecting the additional electrical connection cavity and the external space is provided between the additional base 350 and the additional pressing cover 800; the electrical connection structure is between the first electrical connection part, the second electrical connection part and the additional electrical connection part. The above-mentioned lamp connector can electrically connect more electrical elements to each other through one connector. The circuit structure of the electrical connection structure may be appropriately designed according to actual electrical connection requirements. In the example of the present application, the electrical connection structure includes a conductive core 340, and the conductive core 340 includes a first electrical connection terminal 341 disposed on the first electrical connection part, a second electrical connection terminal 342 disposed on the second electrical connection part and an additional electrical connection terminal 343 disposed on the additional electrical connection part.

Figure 2:
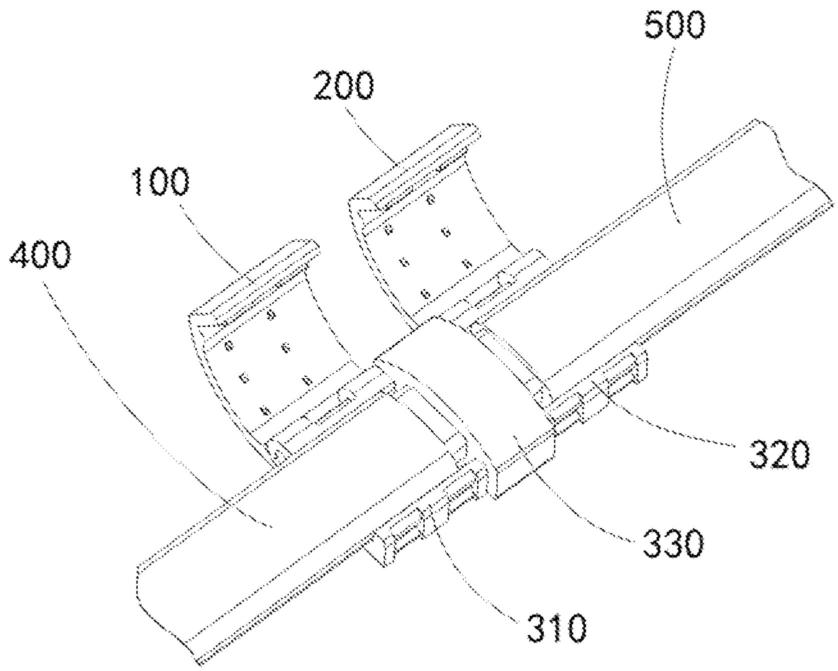
FIG. 2 is a diagram of a changed state of the tandem structure of the light strips shown in FIG. 1, wherein the first pressing cover and the second pressing cover are in an open position.

The example of the present application further discloses a tandem structure of light strips, referring to FIG. 1 to FIG. 3, the tandem structure of light strips includes a first light strip 400, a second light strip 500, and the lamp connector according to the above examples. A first light strip electrical connection terminal 420 of the first light strip 400 is inserted into the first electrical connection cavity 370, a second light strip electrical connection terminal 520 of the second light strip 500 is inserted into the second electrical connection cavity 380. The first light strip 400 and the second light strip 500 are electrically connected through the lamp connector.

Specifically, the first light strip electrical connection terminal 420 and the second light strip electrical connection terminal 520 are electrically connected through the electrical connection structure, the first pressing cover 100 cooperates with the first base 310 to clamp the first light strip 400 tightly, the second pressing cover 200 cooperates with the second base 320 to clamp the second light strip 500 tightly, so that the tandem structure between the first light strip 400 and the second light strip 500 is stable and reliable, the phenomenon of arcing and sparking caused by the looseness and disengagement at the tandem position during use is avoided, and the reliability and safety of the tandem structure of the light strips are improved.

Further, the first light strip 400 includes a first soft rubber sleeve 410, the first light strip electrical connection terminal 420 is arranged in the first soft rubber sleeve 410, the first electrical connection terminal 341 is inserted into the first soft rubber sleeve 410, and the first light strip electrical connection terminal 420 and the first electrical connection terminal 341 at least partially overlap with each other in a pressing direction of the first pressing cover 100, thus, the first light strip electrical connection terminal 420 and the first electrical connection terminal 341 are pressed together tightly. Similarly, the second light strip 500 includes a second soft rubber sleeve 510, the second light strip electrical connection terminal 520 is arranged in the second soft rubber sleeve 510, the second electrical connection terminal 342 is inserted into the second soft rubber sleeve 510, and the second light strip electrical connection terminal 520 and the second electrical connection terminal 342 at least partially overlap with each other in a pressing direction of the second pressing cover 200, thus, the second light strip electrical connection terminal 520 and the second electrical connection terminal 342 are pressed together tightly.

The above solution solves the problem that the lamp is prone to loosening and disengaging at the connector position. The present application further discloses a tandem structure of light strips which comprises a first light strip, a second light strip, and the above-mentioned lamp connector. The above-mentioned examples of the present application focus on the differences between the examples, and as long as the different optimization features between the examples are not contradictory, they can be combined to form a more optimal example. Considering the succinct writing, the details will not be repeated herein.

The technical solution adopted in the present application can achieve the following beneficial effects: In the lamp connector disclosed in the present application, the connector includes the insulating connector body, the first pressing cover, and the second pressing cover, the first electrical connection part of the insulating connector body is provided with the first base, the second electrical connection part is provided with the second base. The first base and the first pressing cover are rotatably connected through the first rotating shaft structure, the first pressing cover and the first base enclose a first electrical connection cavity for the connector to be inserted. The second base and the second pressing cover are rotatably connected through the second rotating shaft structure, the second pressing cover and the second base enclose a second electrical connection cavity for the connector to be inserted. The rotational connection positions between the first base and the first pressing cover and between the second base and the second pressing cover are stable and reliable, which improves the stability and reliability of the connector position of the lamp, and makes the turning of the first pressing cover and the second pressing cover smooth and the operation convenient, and the wire-connection efficiency of the lamp is improved.

The above descriptions are only the examples of the present application, and are not used to limit the present application. For those skilled in the art, the present application may have various modifications and changes. Any modification, equivalent replacement, improvement, etc. made within the spirit and principle of the present application should be included in the scope of the claims of the present application.

What is claimed is:

1. A lamp connector, comprising:

an insulating connector body, wherein the insulating connector body comprises a first electrical connection part and a second electrical connection part, and an electrical connection structure is provided between the first electrical connection part and the second electrical connection part, the first electrical connection part comprises a first base, the second electrical connection part comprises a second base;

a first pressing cover comprising a first end and a second end, that is mounted on the first base through a first rotating shaft structure, wherein the first pressing cover is rotated to switch between an open position and a closed position; in a case that the first pressing cover is in the closed position, the second end of the first pressing cover is fixed to the first base through a first fixing structure, the first base and the first pressing cover enclose a first electrical connection cavity, and a first insertion opening connecting the first electrical connection cavity and an external space is between the first base and the first pressing cover, wherein the first rotating shaft structure comprises a first shaft sleeve and a first shaft, the first shaft is fixed to the first end of the first pressing cover, the first shaft sleeve is fixed to the first base, the first shaft sleeve is sleeved on an outside of the first shaft and wherein the first shaft sleeve is provided with a first shaft installation opening, in the case where the first pressing cover is in the closed position, the first shaft installation opening faces a direction away from the first pressing cover; and a second pressing cover comprising a third end, wherein the third end of the second pressing cover is mounted on the second base through a second rotating shaft structure, wherein the second pressing cover is configured to switch between an open position and a closed position;

in a case that the second pressing cover is in the closed position, a fourth end of the second pressing cover is fixed to the second base through a second fixing structure, the second base and the second pressing cover enclose a second electrical connection cavity, and a second insertion opening connecting the second electrical connection cavity and the external space is between the second base and the second pressing cover, wherein the second rotating shaft structure comprises a second shaft sleeve and a second shaft, the second shaft is fixed to the third end of the second pressing cover, the second shaft sleeve is fixed to the second base, the second shaft sleeve is sleeved on an outside of the second shaft, and wherein the second shaft sleeve is provided with a second shaft installation opening, in the case where the second pressing cover is in the closed position, the second shaft installation opening faces a direction away from the second pressing cover.

2. The lamp connector according to claim 1, wherein:

a first shaft anti-disengagement boss is provided at the first shaft installation opening, the first shaft anti-disengagement boss protrudes toward an inside of the first shaft sleeve; and/or a second shaft anti-disengagement boss is provided at the second shaft installation opening, the second shaft anti-disengagement boss protrudes toward an inside of the second shaft sleeve.

3. The lamp connector according to claim 1, wherein:

the first fixing structure comprises a first clamping protrusion and a first clamping groove, the first clamping protrusion is arranged on one of the first pressing cover and the first base, and the first clamping groove is arranged on the other of the first pressing cover and the first base; and the second fixing structure comprises a second clamping protrusion and a second clamping groove, the second clamping protrusion is arranged on one of the second pressing cover and the second base, and the second clamping groove is arranged on the other of the second pressing cover and the second base.

4. The lamp connector according to claim 3, wherein:

the first fixing structure comprises a first prying gap provided between the first base and the first pressing cover, the first prying gap is on a side of the first base away from the first electrical connection cavity; and the second fixing structure comprises a second prying gap provided between the second base and the second pressing cover, the second prying gap is on a side of the second base away from the second electrical connection cavity.

5. The lamp connector according to claim 3, wherein:

the first base is provided with a first base end face and a first base cavity, the first pressing cover is provided with a first pressing cover end face and a first pressing cover cavity, the first base cavity and the first pressing cover cavity constitute the first electrical connection cavity, a first avoidance gap is between the first base end face and the first pressing cover end face; and the second base is provided with a second base end face and a second base cavity, the second pressing cover is provided with a second pressing cover end face and a second pressing cover cavity, the second base cavity and the second pressing cover cavity constitute the second electrical connection cavity, a second avoidance gap is between the second base end face and the second pressing cover end face.

6. The lamp connector according to claim 1, wherein:

the first pressing cover comprises a first clamping boss, the first clamping boss protrudes toward the first electrical connection cavity, the second pressing cover comprises a second clamping boss, the second clamping boss protrudes toward the second electrical connection cavity; and/or the first base comprises a first clamping rib, and the first clamping rib protrudes toward the first electrical connection cavity, the second base comprises a second clamping rib, and the second clamping rib protrudes toward the second electrical connection cavity.

7. The lamp connector according to claim 1, wherein the insulating connector body comprises a rotating connection part, the first electrical connection part and the second electrical connection part are connected through the rotating connection part, the first electrical connection part and the second electrical connection part rotate relative to each other around a central axis of the rotating connection part.

8. The lamp connector according to claim 7, wherein the rotating connection part comprises a first rotating shaft sleeve, a second rotating shaft sleeve and a rotating shaft, the first rotating shaft sleeve and the second rotating shaft sleeve are sleeved on an outside of the rotating shaft, the first rotating shaft sleeve is fixed on the first electrical connection part, the second rotating shaft sleeve is fixed on the second electrical connection part, the electrical connection structure comprises an insulating structure body and a conductive core, the insulating structure body wraps on an outside of the conductive core; the conductive core comprises a first electrical connection terminal, a second electrical connection terminal, and a flexible wire connecting the first electrical connection terminal and the second electrical connection terminal, the first electrical connection terminal is exposed in the first electrical connection cavity, the second electrical connection terminal is exposed in the second electrical connection cavity, wherein a wire channel is provided in the first rotating shaft sleeve and the second rotating shaft sleeve, the flexible wire extends through the wire channel.

9. The lamp connector according to claim 1, wherein the lamp connector comprises one or more additional pressing covers, the insulating connector body comprise one or more additional electrical connection parts, the additional electrical connection part comprises an additional base, the additional base and the additional pressing cover enclose an additional electrical connection cavity; an additional insertion opening connecting the additional electrical connection cavity and the external space is provided between the additional base and the additional pressing cover, the electrical connection structure is between the first electrical connection part, the second electrical connection part and the additional electrical connection part.

10. The lamp connector according to claim 1, wherein the electrical connection structure comprises an insulating structure body and a conductive core, the insulating structure body wraps on an outside of the conductive core, the conductive core comprises a first electrical connection terminal and a second electrical connection terminal, the first electrical connection terminal is exposed in the first electrical connection cavity, the second electrical connection terminal is exposed in the second electrical connection cavity.

11. The lamp connector according to claim 10, wherein the insulating structure body comprises a first insertion piece extending into the first electrical connection cavity and a second insertion piece extending into the second electrical connection cavity, the first electrical connection terminal is on a side of the first insertion piece facing toward the first base, the second electrical connection terminal is on a side of the second insertion piece facing toward the second base, a first gap is between the first insertion piece and the first pressing cover, a second gap is between the first insertion piece and the first base, a third gap is between the second insertion piece and the second pressing cover, and a fourth gap is between the second insertion piece and the second base.

12. A tandem structure of light strips, comprising: a first light strip, a second light strip, and the lamp connector according to claim 11, wherein a first light strip electrical connection terminal of the first light strip is inserted into the first electrical connection cavity, a second light strip electrical connection terminal of the second light strip is inserted into the second electrical connection cavity, the first light strip electrical connection terminal and the second light strip electrical connection terminal are electrically connected through the electrical connection structure; wherein the first pressing cover cooperates with the first base to clamp the first light strip, the second pressing cover cooperates with the second base to clamp the second light strip; the first light strip comprises a first soft rubber sleeve, the first light strip electrical connection terminal is arranged in the first soft rubber sleeve, the first electrical connection terminal is inserted into the first soft rubber sleeve, and the first light strip electrical connection terminal and the first electrical connection terminal at least partially overlap with each other in a pressing direction of the first pressing cover; the second light strip comprises a second soft rubber sleeve, the second light strip electrical connection terminal is arranged in the second soft rubber sleeve, the second electrical connection terminal is inserted into the second soft rubber sleeve, and the second light strip electrical connection terminal and the second electrical connection terminal at least partially overlap with each other in a pressing direction of the second pressing cover.

13. A tandem structure of light strips, comprising:

a first light strip, a second light strip, and a lamp connector comprising:

an insulating connector body, wherein the insulating connector body comprises a first electrical connection part and a second electrical connection part, and an electrical connection structure is provided between the first electrical connection part and the second electrical connection part, the first electrical connection part comprises a first base, the second electrical connection part comprises a second base;

a first pressing cover comprising a first end and a second end, that is mounted on the first base through a first rotating shaft structure, wherein the first pressing cover is rotated to switch between an open position and a closed position; in a case that the first pressing cover is in the closed position, the second end of the first pressing cover is fixed to the first base through a first fixing structure, the first base and the first pressing cover enclose a first electrical connection cavity, and a first insertion opening connecting the first electrical connection cavity and an external space is between the first base and the first pressing cover, wherein the first rotating shaft structure comprises a first shaft sleeve and a first shaft, the first shaft is fixed to the first end of the first pressing cover, the first shaft sleeve is fixed to the first base, the first shaft sleeve is sleeved on an outside of the first shaft, and wherein the first shaft sleeve is provided with a first shaft installation opening, in the case where the first pressing cover is in the closed position, the first shaft installation opening faces a direction away from the first pressing cover; and a second pressing cover comprising a third end, wherein the third end of the second pressing cover is mounted on the second base through a second rotating shaft structure, wherein a first light strip electrical connection terminal of the first light strip is inserted into the first electrical connection cavity, a second light strip electrical connection terminal of the second light strip is inserted into the second electrical connection cavity, the first light strip electrical connection terminal and the second light strip electrical connection terminal are electrically connected through the electrical connection structure, wherein the first pressing cover cooperates with the first base to clamp the first light strip, the second pressing cover cooperates with the second base to clamp the second light strip, wherein the second pressing cover is configured to switch between an open position and a closed position; in a case that the second pressing cover is in the closed position, a fourth end of the second pressing cover is fixed to the second base through a second fixing structure, the second base and the second pressing cover enclose a second electrical connection cavity, and a second insertion opening connecting the second electrical connection cavity and the external space is between the second base and the second pressing cover, wherein the second rotating shaft structure comprises a second shaft sleeve and a second shaft, the second shaft is fixed to the third end of the second pressing cover, the second shaft sleeve is fixed to the second base, the second shaft sleeve is sleeved on an outside of the second shaft, and wherein the second shaft sleeve is provided with a second shaft installation opening, in the case where the second pressing cover is in the closed position, the second shaft installation opening faces a direction away from the second pressing cover.

14. The tandem structure of light strips according to claim 13, wherein the first fixing structure comprises a first clamping protrusion and a first clamping groove, the first clamping protrusion is arranged on one of the first pressing cover and the first base, and the first clamping groove is arranged on the other of the first pressing cover and the first base; and wherein the second fixing structure comprises a second clamping protrusion and a second clamping groove, the second clamping protrusion is arranged on one of the second pressing cover and the second base, and the second clamping groove is arranged on the other of the second pressing cover and the second base.

15. A lamp connector, comprising:

an insulating connector body, wherein the insulating connector body comprises a first electrical connection part and a second electrical connection part, and an electrical connection structure is provided between the first electrical connection part and the second electrical connection part, the first electrical connection part comprises a first base, the second electrical connection part comprises a second base;

a first pressing cover comprising a first end and a second end, that is mounted on the first base through a first rotating shaft structure, wherein the first pressing cover is rotated to switch between an open position and a closed position; in a case that the first pressing cover is in the closed position, the second end of the first pressing cover is fixed to the first base through a first fixing structure, the first base and the first pressing cover enclose a first electrical connection cavity, and a first insertion opening connecting the first electrical connection cavity and an external space is between the first base and the first pressing cover, wherein the first rotating shaft structure comprises a first shaft sleeve and a first shaft, the first shaft is fixed to the first end of the first pressing cover, the first shaft sleeve is fixed to the first base, and wherein the first shaft sleeve is provided with a first shaft installation opening, the first shaft installation opening facing a direction away from the first pressing cover; and a second pressing cover comprising a third end, wherein the third end of the second pressing cover is mounted on the second base through a second rotating shaft structure, wherein the second pressing cover is configured to switch between an open position and a closed position; in a case that the second pressing cover is in the closed position, a fourth end of the second pressing cover is fixed to the second base through a second fixing structure, the second base and the second pressing cover enclose a second electrical connection cavity, and a second insertion opening connecting the second electrical connection cavity and the external space is between the second base and the second pressing cover, wherein the second rotating shaft structure comprises a second shaft sleeve and a second shaft, the second shaft is fixed to the third end of the second pressing cover, the second shaft sleeve is fixed to the second base, and wherein the second shaft sleeve is provided with a second shaft installation opening.

* * * * *